Patented Oct. 21, 1924.

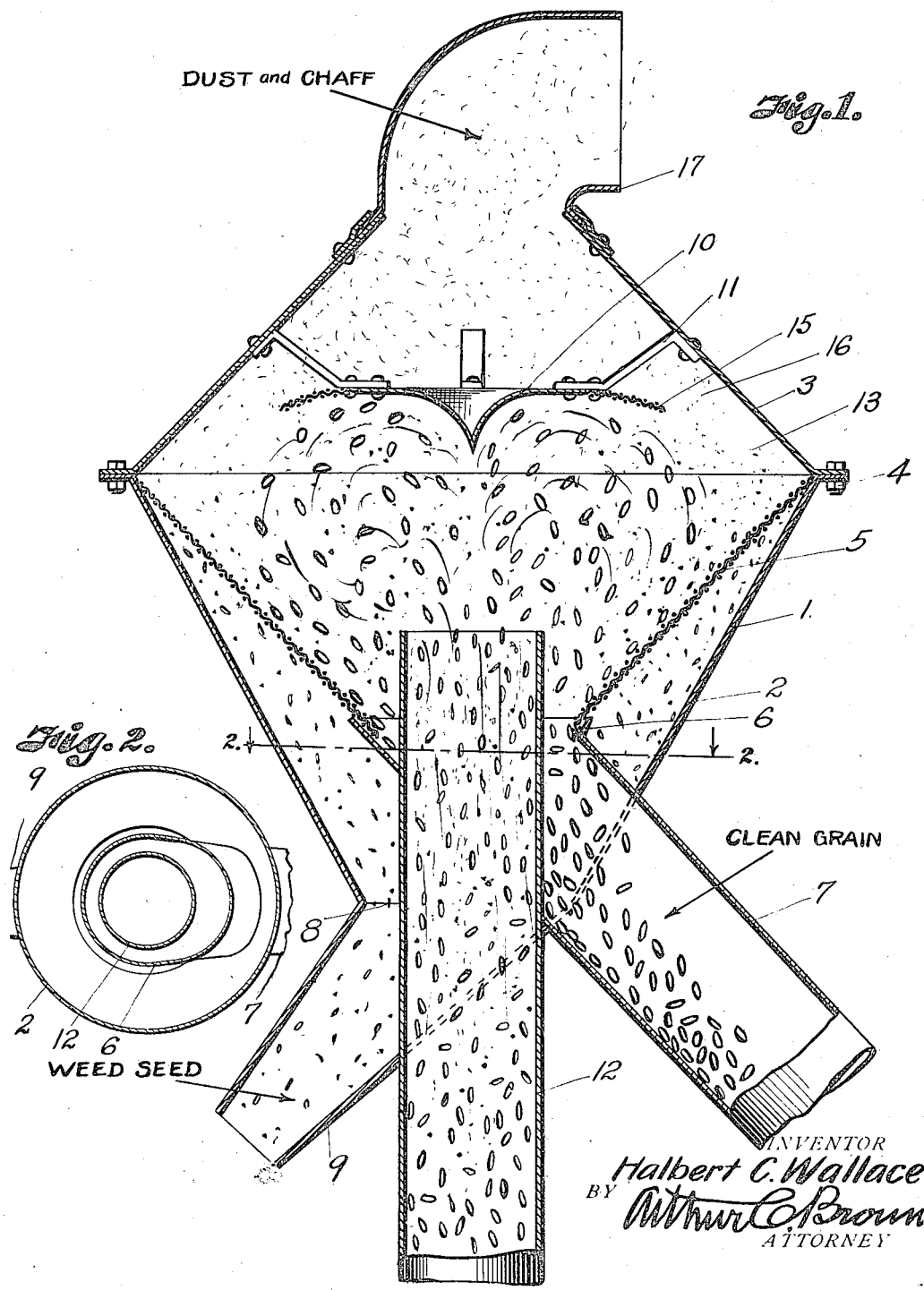

1,512,323

UNITED STATES PATENT OFFICE.

HALBERT C. WALLACE, OF KANSAS CITY, MISSOURI.

GRAIN CLEANER.

Application filed October 8, 1923. Serial No. 667,158.

*To all whom it may concern:*

Be it known that I, HALBERT C. WALLACE, a citizen of the United States, residing at Kansas City, in the county of Jackson and State of Missouri, have invented certain new and useful Improvements in Grain Cleaners; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to grain cleaners and the primary object is to provide a novel form of grain cleaner by means of which weed seed, dust and other extraneous matter can be separated from the grain kernel.

The invention contemplates the provision of means for receiving the grain from a pneumatic conveyor, through the outlet end of which the grain is blown into the cleaner. The grain is there subjected to a screening action so that the extraneous matter will se separated and the clean grain can pass off into a receptacle provided for its reception.

In the drawings,

Fig. 1 is a vertical, longitudinal, sectional view through a grain cleaner constructed in accordance with my invention, and Fig. 2 is a cross sectional view on the line 2—2 of Fig. 1.

The casing 1 is shown as comprising a double cone consisting of a bottom inverted cone member 2 and a top cone member 3. The bases of the cone members are secured together by suitable fastening devices, such as bolts 4. Within the cone member 2 and secured between the flanges of the members 2 and 3 is a depending conical screen 5, at the vertex of which is a hopper 6 connected to a spout 7 which leads off to a suitable receptacle or which may discharge at any suitable point.

The bottom of the member 2 is provided with a discharge opening 8 surrounded by a spout 9 through which the weed seed and other extraneous matter which has passed through the screen 5 may discharge.

Located above the conical screen 5 is a conical baffle 10, supported from the member 3 by brackets 11. The baffle 10 is in the form of an inverted cone, the vertex extending downwardly substantially in line with the axis of the inlet pipe 12, which passes through the bottom of the member 2 and discharges into the chamber 13 formed by the upper part of the member 2. The baffle 10 carries a circumferential, downwardly curved, outstanding screen 15, the periphery of which is spaced from the member 3 to form a passageway 16, by means of which the lighter particles which are too large to pass through the screen may pass above the screen and out through the discharge nozzle 17. The discharge nozzle 17 is preferably mounted to rotate on the member 3 so that the material to be discharged can be thrown in any direction.

When the parts are assembled and the grain with the extraneous matter is introduced into the chamber 13, it will be thrown with considerable force against the baffle 10. Due to the shape of the baffle it will be directed outwardly. The very light particles will pass through the screen 15 but the mesh of the screen will be small enough to arrest the upward movement of the grain kernels. The light matter may also pass through the passageway 16 and the heavier dirt or extraneous matter together with the grain will fall upon the screen 5. By a rolling action the extraneous matter will be separated by passing through the screen 5 and be directed out through the nozzle 9. The clean grain will pass through the hopper 6 and out through the spout.

What I claim and desire to secure by Letters-Patent is:

1. A grain cleaner comprising a casing having an inlet through the bottom thereof, a pipe for directing grain through the opening into the casing, a conical screen in the casing forming a screening chamber about the discharge end of the pipe, a spout leading from the bottom of the screening chamber, a spout leading from the bottom of the casing, and a baffle in the upper end of the casing, the edge of the baffle being spaced away from the casing to provide a passageway whereby the lighter particles may pass above the baffle, the upper end of the casing being open to permit the escape of the lighter particles.

2. A grain cleaner comprising a casing having an inlet through the bottom thereof, a pipe for directing grain through the opening into the casing, a conical screen in the casing forming a screening chamber about the discharge end of the pipe, a spout leading from the bottom of the screening chamber, a spout leading from the bottom of the casing, a baffle in the upper end of the casing, an outwardly extending screen carried by the periphery of the baffle, the outer edge of the screen being spaced away from the casing to provide a passageway whereby the lighter particles may pass above the screen, the upper end of the casing being open to permit the escape of the lighter particles.

3. A grain cleaner comprising a casing consisting of two cone members connected at their base ends, a pipe projecting through the vertex of the lower cone member, a conical screen carried by the lower cone member and discharging into a spout having an inlet surrounding the pipe, an outlet for the bottom of the lower cone member, and a baffle in the casing above the pipe, the upper end of the casing being provided with an opening.

4. A grain cleaner comprising a casing consisting of two cone members connected at their base ends, a pipe projecting through the vertex of the lower cone member, a conical screen carried by the lower cone member and discharging into a spout having an inlet surrounding the pipe, an outlet for the bottom of the lower cone member, a baffle in the casing above the pipe, and a rotatable discharge spout at the upper end of the casing.

5. A grain cleaner comprising a casing, a pipe projecting through the lower end of the casing, a conical screen surrounding the pipe, a spout connected to the screen and also surrounding the pipe in spaced relation thereto, and a circumferential screen in the casing above the pipe, the edge of the screen being spaced from the casing, the top of the casing being provided with an outlet.

6. A grain cleaner comprising a casing, a screen in the casing having downwardly and inwardly inclined walls, a hopper into which the screen discharges, a pipe projecting through the hopper and of less diameter than that of the hopper, and a screen supported above the pipe, the edge of which is spaced from the casing.

In testimony whereof I affix my signature.

HALBERT C. WALLACE.